Aug. 18, 1970

K. L. McKINNON 3,524,280

VASE

Filed July 28, 1969

INVENTOR.
KENNETH L. McKINNON
BY
Owen, Wickersham & Erickson
ATTORNEYS

*INVENTOR.*
KENNETH L. McKINNON
BY
*Owen, Wickersham & Erickson*
ATTORNEYS

United States Patent Office 3,524,280
Patented Aug. 18, 1970

3,524,280
VASE
Kenneth L. McKinnon, 1010 B St.,
San Rafael, Calif. 94901
Continuation-in-part of application Ser. No. 662,050,
Aug. 21, 1967. This application July 28, 1969, Ser.
No. 845,331
Int. Cl. B65d 7/42; A47g 7/06, 7/07
U.S. Cl. 47—41.11                                  9 Claims

ABSTRACT OF THE DISCLOSURE

A heavy flower vase having thick imperforate walls provided with a multiplicity of pockets that are generally V-shaped in cross section, though of varying length and depth. The pockets cover the interior surface of the walls and bottom of the vase. The generally V-shaped concavities, preferably arranged in esthetic patterns, function to hold fixed, both vertically and horizontally, the ends of large and small flower arrangement materials, including tree branches that are heavy and long relative to the size of the vase and to most flower stems.

---

Figure 1:
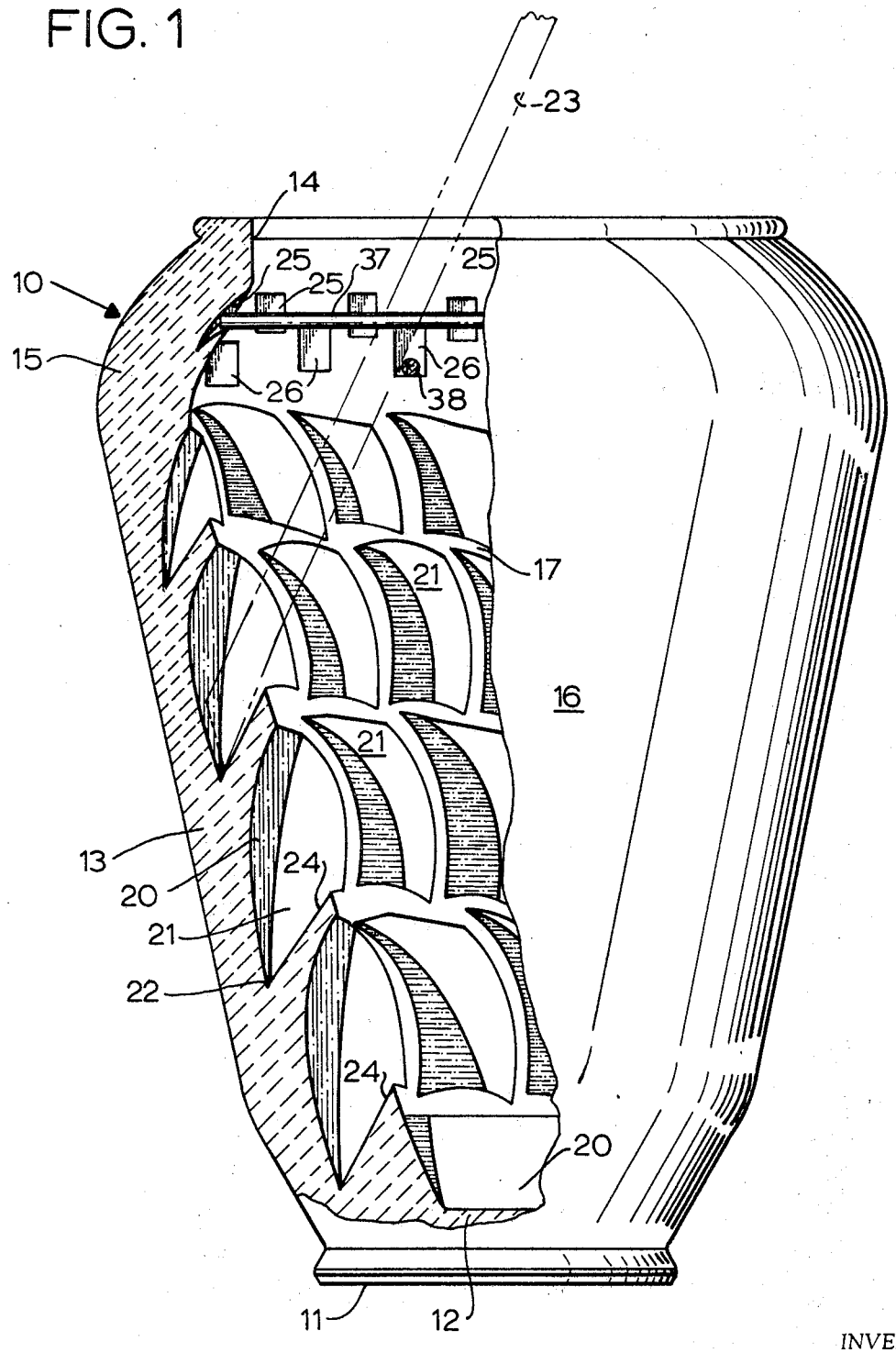

This application is a continuation-in-part of application Ser. No. 662,050 filed Aug. 21, 1967 and now abandoned.

This invention relates to an improved vase or branch and flower container, particularly suited to aid in flower arrangement, especially in making Japanese-style arrangements.

Those conventional vases which are taller than they are wide, while often beautiful in themselves, do not lend themselves readily to interesting flower arrangements, because the ends of branches and the stems of the flowers tend to slide up or down the smooth interior walls of the vase instead of staying where put. In low open broad vases, pin holders may work well, but they are not much help in vases of the generally vertical type or even in some relatively short vases with relatively small mouths. In these vases, many flower "arrangements" comprise nothing more than plunging the flower stems into the water in the vase and leaving practically everything up to gravity and the length to which the stem has been cut. This is hardly satisfying to a skilled flower arranger or to anyone who is interested in making pleasing artistic or original arrangements, of the nonposy variety. Especially are such vases unsuited to wide-angle, Japanese style arrangements, many of which use long heavy branches. It is to these problems vases that this invention especially relates— the medium to tall vases where the ratio of the vase's width of base to its height is from about 1:1 and greater. However, the invention is also applicable to the shorter vases.

Vases of the present invention are characterized by having a thick imperforate wall recessed interiorly to provide a multiplicity of stem receiving and retaining recesses or pockets, generally V-shaped as seen in cross section. The V-shaped recesses can each take the form of a simple pocket, formed in wet clay by making a triangular or even rectangular section followed by an upward pull; or the generally V-shaped recesses may have a more complex shape, for the tool used in making the incision may be dragged to the right or left during the upward pull, in order to control excessive wall thickness, or the tool can be brought about full circle to form a conical recess. In all events, its V-shaped cross section enables the recess or pocket to hold the ends of both large-diameter and small-diameter stems effectively.

Although the vase need not be made from clay, there are many advantages in doing so, both from the standpoint of practicality, where the weight of clay provides a heavy counter-balance to the material being arranged, and from the standpoint of esthetics where subtle and individual effects are readily obtainable. When making the vase from clay, there is a special problem to be considered, namely, the tendency of clay to explode or crack when too thick a piece is fired. Since the provision of relatively deep pockets necessitates substantial wall thickness, care is taken to so dispose the pockets over the vase that they are relatively close together and cover the interior surface, leaving relatively thin ribs between pockets. In this manner, the potter may start with relatively thick walls and may remove enough clay when forming the pockets so that nowhere are there left areas thick enough to cause explosion or cracking during firing.

Another feature of this vase is the provision near the vase mouth of one or more rings of pockets capable of retaining sticks or wires as additional means for holding the stems and branches in place.

Other objects and advantages of the invention will appear from the following description of some preferred embodiments of the invention.

In the drawings:

FIG. 1 is a view in side elevation and partly in section of a vase embodying the principles of the invention. One flower stem is shown in broken lines.

Figure 2:
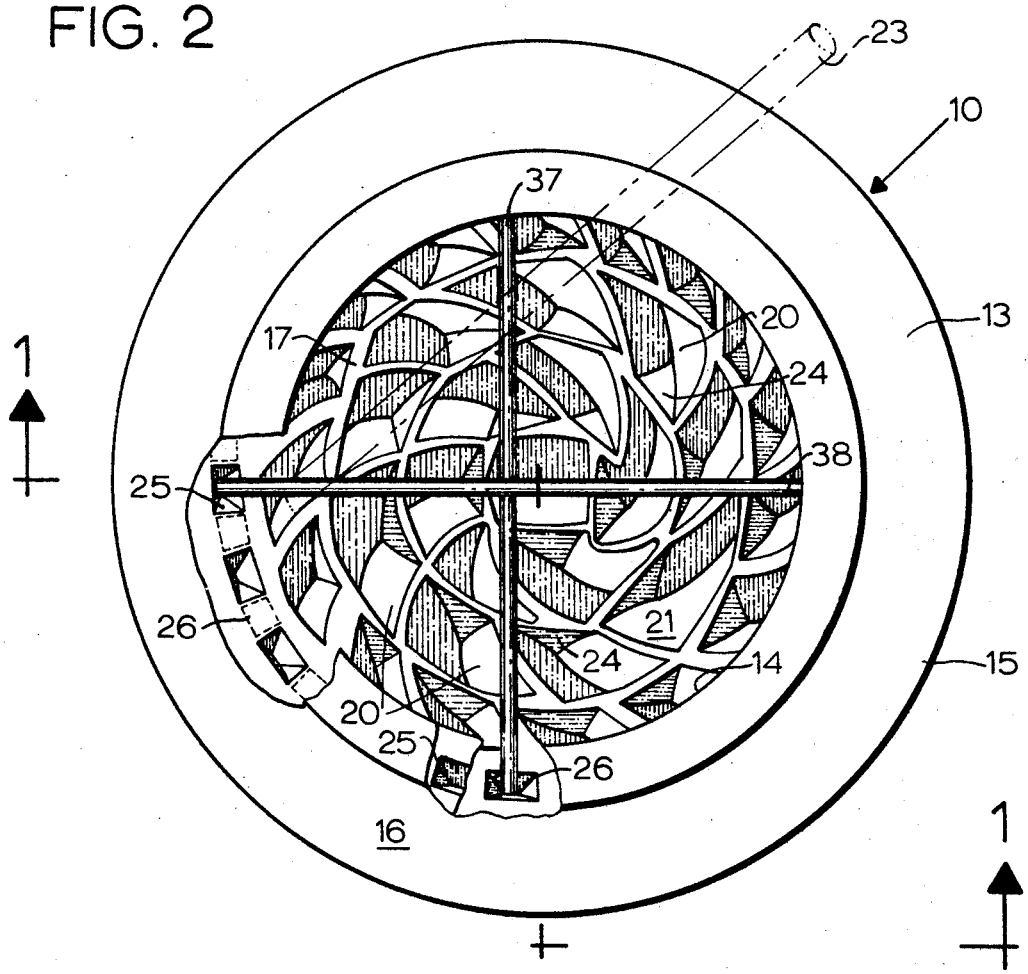

FIG. 2 is a top plan view of the vase of FIG. 1 partly broken away at the top to show the pockets that lie just below the mouth. In this view two sticks span the vase mouth, crossing each other at right angles. The stem is again shown in broken lines.

Figure 3:
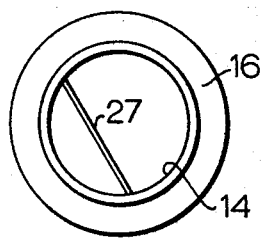

FIGS. 3 through 6 are top plan views on a reduced scale of the mouth portion of the vase only, showing some of various dispositions of sticks at the vase mouth, made possible by the pockets that lie just below the mouth. For clarity, the main pockets are omitted from these views, though they are, of course, present. In FIG. 3, one stick only is used, in FIG. 4 two parallel sticks, in FIG. 5 three crossing sticks, and in FIG. 6, four sticks.

FIGS. 1 and 2 show a vase 10 embodying the principles of the invention. The exterior shape is not critical, for an infinite variety of specific shapes is available, but this vase 10 does illustrate the principles involved. The vase 10 has a base 11 providing a bottom wall 12 and a round side wall 13, extending upwardly from the base 11, preferably pleasingly rounded and esthetically shaped, and terminating at the top in a mouth 14. The mouth 14 may be narrower than some of the parts below it, and here the vase 10 reaches a maximum width both interiorly and exteriorly at a shoulder portion 15. The exterior surface 16 may be quite smooth, as shown, but need not be, if exterior surface relief is desired; exteriorly the vase 10 may give any appearance desired.

The invention relates to the interior surface 17 of the vase, which comprises a large number of generally V-shaped pockets or recesses 20, occupying substantially all of the interior surface 17 except for the rib-like members 21 that separate the recesses 20 from each other. If desired, some of the surface 17 may be free of recesses, if made thin enough to avoid the likelihood of explosion or cracking, but in any event, that surface area 17 which stems or branch ends may touch is made up of the recesses 20 and ribs 21.

The recesses 20 preferably make a pleasing pattern when one looks inside, and they cover not only the interior of the side wall 13 but also the bottom wall 12, where also they are V-shaped as seen in section. All the recesses or pockets 20 are preferably made relatively deep and extend into the side wall 13 at a downward angle so that their deepest portion 22 lies well below the innermost surface of the adjacent bottom rib 21. The general V-shape of the cross section shows well in FIG. 1; this shape is important since it provides a taper that enables each pocket 20 to accommodate a wide variety of stem diameters. The somewhat resilient nature of stems and boughs 23 is taken advantage of to cooperate with this V-shape to retain the stem or branch 23 in place where the arranger places it. The rib-like walls 21 of the recesses 20 thus define the pockets or receptacles, which are expected to receive and hold one stem or branch 23 and to do so positively and firmly. The converging walls cooperate with the natural resilience of the branch or stem 23 to retain it in place. Once placed, the stem or branch 23 is not able to slide or shift position, giving the arranger a control he needs but has not had hitherto.

Typically, the pockets 20 may be shaped to provide a generally planar bottom surface 24 on the bottom rib 21 for that pocket. The bottom surface 24 is preferably generally horizontal at the interior surface 17 and is inclined downwardly toward the exterior surface 16 and the deepest portion 22. The inclination may be at about 45° but can vary widely. However, the pocket 20 may be conical in shape if desired, and a V-shaped tool may make either the cone (by rotation in the wet clay after insertion) or the shape shown in FIGS. 1 and 2 (by dragging it upwardly and sideways simultaneously), and other shapes are quite possible.

Note, however, that for the pockets 20 to be most effective they should be relatively large, large enough to receive and retain thick stems 23 and even tree branches of the type used in Japanese arrangements. In order for the pockets 20 to be large in clay vases, the pockets 20 must be close enough together to avoid overthick portions of clay, so that the danger of explosion or cracking during firing is avoided. Preferably, there are as many recesses 20 as can be accommodated when the vase 10 is being produced, and recesses well toward the mouth 14 are useful, as well as those near or in the bottom wall 12.

Figure 4:
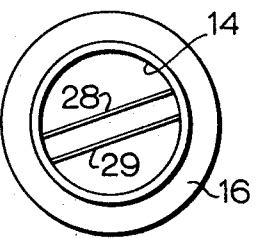
Figure 5:
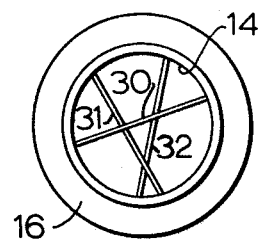
Figure 6:
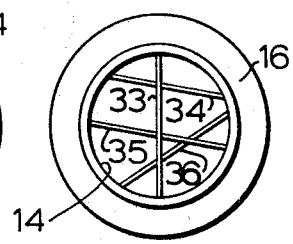

In addition, and for a different purpose, there are preferably other recesses or pockets 25 and 26, preferably arranged in a plurality of rings quite near the mouth 14 itself, to enable the use of sticks or wires to give an additional retentive effect, either as a second or auxiliary support for heavy limbs or as a higher support for somewhat limp material. The series of views, FIGS. 3 to 6, show a few of the many different possible arrangements. In FIG. 3, a single stick or wire 27 is held by two recesses 25 or 26 not shown in this series of views but shown well in FIGS. 1 and 2. In FIG. 4, two wires or sticks 28 and 29 are each held by two recesses 25 or 26 and lie generally parallel to each other. In FIG. 5, three sticks or wires 30, 31 and 32 are used in a crossing pattern; the stick or wire 30 has its ends retained by two of the upper pockets 25, the stick or wire 31 may have one end in a pocket 25 and the other end in a pocket 26, so that it lies below the stick or wire 30, while the stick or wire 32 has both ends in pockets 26 and lies below the stick or wire 31. Finally, in FIG. 6, there are four wires or sticks 33, 34, 35, and 36. The wire or stick 33 may have both ends in pockets 25, while the wire or stick 34 may have both ends in pockets 26, as may the wire or stick 36. The wire or stick 35 may have one end in an upper pocket 25 and one end in a lower pocket 26. The pattern of sticks employed usually depends on which school of flower arrangement one follows. The vase 10 of this invention enables each person to have freedom of choice, according to his school's custom.

While the use of two or more rings of pockets 25, 26 is desirable, there may be only only one such ring, with the resiliency of the stick or wire accommodating crossing. The sticks or wires need not be straight; they may be forked or curved. In FIGS. 1 and 2, there are shown two straight wires or sticks 37 and 38; the stick or wire 37 has its ends retained by pockets 25, while the wire or stick 38 has its ends retained by pockets 26. Hence the sticks or wires 37 and 38 serve as retainers at or adjacent to the mouth 14. Hence, stems 23 can be inserted at various angles and retained, not only by the recesses 20 but also either by the mouth 14 of the vase 10 or by one of the wires or sticks 37, 38. Thus, a very wide flat-angle type of Japanese flower arrangement can be achieved with a tall and narrow vase. The stems or branches may be inserted by the flower arranger in practically any position he desires, and are held in their positions by the vase 10 or by the sticks or wires it supports.

While only one of the nearly innumerable possible vase forms has been shown, the invention is not confined to the form of the vase. Practically any type of vase can be used, although, as implied, the invention is most useful for those vases that are at least as high as they are wide. Yet that is not essential for practice of the invention, and even small, squat vases can be used in conjunction with the invention. The vase may be made in any manner desired, so far as its exterior surface is concerned, giving wide range to the imagination and artistry of the potter. In fact, the vase does not need to be made of pottery, but may be made of any of several materials, including ceramic, cast metal, and plastic, and may be made to the desired form in any suitable manner. If the material is very light in weight, some weighting of the bottom wall 12 may be advisable. Handmade pottery vases are particularly suitable to the invention, but the invention is not limited to them. There may be any desired external decorative form, the important thing being the unique internal functional structure, which is independent of external decoration. The recesses 20 (and the recesses 25 and 26) may be of various shapes, to provide internal esthetics or to control the thickness of the material (e.g., in a clay vase to prevent its explosion or cracking during firing). The pockets 20 should exist in such number, location, and size as is suitable to the size and shape of the vase, and upon the size of the flower arrangement material to be used. The pockets 20, 25, and 26 are made an integral part of the walls and floor of the container, in order to provide a definite vertical and horizontal stop for the stem end.

This new vase also increases the speed with which a flower arranger can complete his arrangement, as well as increasing the stability of the resulting arrangement. It is particularly helpful to flower arrangers of average ability or relatively little experience, but it is also helpful to those who are very experienced and completely able to handle their materials.

Since the V-shaped concavities or recess 20 provide a definite seat for the end of each branch or stem 23 of th flower arrangement material, they enable wide choices of the angles and directions at which the branch or stem 23 of the flower arrangement material can leave the mouth 14 of the vase and still have a secure seat in the wall 13 of the vase. The invention gives complete freedom to the flower arranger, so that he, for example, could keep the material all to one side of the mouth 14 of the vase 10, in order that some of the water might show as an element in his arrangement.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A flower vase having an imperforate bottom wall and an imperforate side wall, with said side wall shaped to provide a multiplicity of stem-receiving and retaining pockets covering the internal surface, each pocket having downwardly converging walls suitable for retaining stems.

2. The vase of claim 1 wherein said bottom wall also has some of said stem receiving and retaining pockets.

3. The vase of claim 1 wherein each of said pockets has a generally planar bottom surface, inclined to the horizontal and extending to the deepest part of said pocket, with other defining surfaces converging toward said bottom surface and toward each other.

4. The vase of claim 1 wherein each said pocket is V-shaped as seen in section.

5. The vase of claim 1 having a mouth and a series of recesses ringed around the vase side wall inside the vase and just below the mouth, for retaining auxiliary sticks or wires.

6. A pottery vase for flower arrangement having a bottom wall and a side wall, both imperforate and provided on their interior side with a plurality of stem-receiving and retaining recesses, covering an interior surface of said vase, each recess being provided with downwardly converging walls so as to retain stems where they are placed.

7. The vase of claim 6 having a mouth and at least one ring of additional pockets just below the mouth inside the vase, for retention of auxiliary support material.

8. The vase of claim 7 wherein there is a plurality of rings of said pockets at different distances below the mouth.

9. The vase of claim 6 wherein the bottom of each recess is a downwardly sloping planar surface toward which the other walls of the recess converge.

References Cited

UNITED STATES PATENTS

| | | | |
|---|---|---|---|
| 1,462,947 | 7/1923 | Stuck | 47—41.11 |
| 2,407,507 | 9/1946 | Mitchell | 47—41.11 |
| 2,691,849 | 10/1954 | Ehlers | 47—41.11 |
| 2,818,681 | 1/1958 | Coplen | 47—34 |
| 3,048,942 | 8/1962 | Boetticher et al. | 47—41.13 |

ROBERT E. BAGWILL, Primary Assistant

U.S. Cl. X.R.

D29—28; 220—83